United States Patent [19]

Tlaker et al.

[11] Patent Number: 4,784,538
[45] Date of Patent: * Nov. 15, 1988

[54] DISPOSABLE DISK CUTTER

[75] Inventors: Erich Tlaker, Springfield, Vt.; Aaron Erisman, Charlestown, N.H.; Donald Whitney, N. Springfield, Vt.

[73] Assignee: Fellows Corporation, Springfield, Vt.

[*] Notice: The portion of the term of this patent subsequent to Dec. 16, 2003 has been disclaimed.

[21] Appl. No.: 877,578

[22] Filed: Jun. 23, 1986

Related U.S. Application Data

[63] Continuation of Ser. No. 760,697, Jul. 30, 1985, Pat. No. 4,629,377.

[51] Int. Cl.$^4$ ............................................. B23F 21/28
[52] U.S. Cl. .................................... 409/35; 407/28
[58] Field of Search ................................. 407/13–29; 409/35; 76/101 R, 101 A

[56] References Cited

U.S. PATENT DOCUMENTS

| | | | |
|---|---|---|---|
| 579,570 | 3/1897 | Fellows | 407/28 |
| 2,119,298 | 5/1938 | Simowski | 407/27 |
| 2,171,325 | 8/1939 | Hawgood | 407/27 |
| 2,228,968 | 1/1941 | Miller | 407/27 |
| 3,178,800 | 4/1965 | Psenka | 407/16 |
| 3,553,909 | 1/1971 | Tersch | 407/16 |
| 3,762,006 | 10/1973 | Tersch | 407/14 |
| 4,038,730 | 8/1977 | Tersch | 407/14 |
| 4,576,527 | 3/1986 | Haug | 407/28 |

Primary Examiner—Nicholas P. Godici
Attorney, Agent, or Firm—Wolf, Greenfield & Sacks

[57] ABSTRACT

A gear cutter assembly incorporating a toothed flexible disk which acts as the cutting element, mounted between a cutter back and a disk retainer. The cutter back includes a convex, conical mounting face, and the disk retainer has a complementary mounting surface, so that the disk is clamped between these surface and deflected to create a negative rake angle. The disk is formed with teeth which protrude beyond the cutter back and retainer, and it has a constant cross-section throughout its width. When the cutting edges of the disk teeth become dull, the disk may be inverted and reused due to its untapered profile; after such reuse, the disk is discarded. The cutter disk is easily fabricated in groups, and enjoys economical, high performance operation.

10 Claims, 9 Drawing Sheets

DISPOSABLE DISK CUTTER

This is a continuation of application Ser. No. 760,697, filed July 30, 1985, now U.S. Pat. No. 4,629,377.

BACKGROUND OF THE INVENTION

The present invention relates to a metal cutter tool of the type used for producing profiled workpieces by chip cutting methods. More particularly, the invention relates to shaper cutters incorporating inserted members.

Shaper cutters for machining gears or similar profiled workpieces have taken a variety of forms over the years, but typically have included a conical or cylindrical tool body having a series of circumferentially spaced teeth. In order to permit cutting by the leading edges of the cutter teeth, the periperal surfaces of the teeth are tapered away from these leading edges to provide a clearance region for the metal shavings or cuttings. It has been found that coating the teeth with titanium nitride or like wear resistant coatings enhances their cutting performance and edge wear.

There are a number of practical objections to this prior art tool design, relating to the need for intermittently regrinding the teeth to maintain desired sharpness. Such regrinding impairs the precision of the tools cutting profile, requires adjustments in the mounting of the cutter relative to the workpiece, and removes the surface coating. Therefore, investigators have tried a number of alternative approaches to designing an economical, long-lived cutter.

One approach to the economical design of shaper cutters as well as hobs is the "inserted blade" type, wherein the tool includes a support structure with a plurality of inserted teeth. Illustrative patents include U.S. Pat. Nos. 2,498,721; 2,706,848; 3,520,044; 3,571,875; 3,688,368; 3,740,808; 4,102,583; 4,135,414; 4,170,161; 4,188,161; and 4,197,039. Another approach has been to provide a plurality of stacked rings with cutting edges defining a composite cutting profile. This technique is shown in U.S. Pat. Nos. 3,303,554; 3,762,006; and 4,218,159.

European patent publication No. 132,350, filed July 12, 1984, discloses a gear shaper cutter including a flexible wafer clamped between a tool body and a clamping ring. Unlike the tool of the present invention, this shaper cutter utilizes a concave mounting surface of the tool body against which the wafer is flexed to provide a positive rake angle. In order to achieve the needed clearance angles for the cutter wafer teeth, the wafer is ground with tapered "back angles". This wafer profile prevents inversion and reuse of the cutter wafer.

Accordingly, it is a primary object of the invention to provide improved designs for shaper cutter tools. Such design should enjoy excellent cutting characteristics, while providing improved economies of use.

SUMMARY OF THE INVENTION

In satisfying the above and additional objects, the invention provides a cutting tool including a cutter back having a convex mounting face, a retainer with a complementary mounting face, and a cutter disk which is clamped between the cutter back and retainer and thereby deflected to form a negative face angle. The cutter disk includes peripheral teeth which have untapered outer surfaces (typically normal to the disk faces), which teeth project beyond supporting portions of the cutter back and retainer. The composite cutter may be utilized for example as a shaper cutter or finishing cutter, with the leading edges of the disk used for cutting. When the disk becomes dull, it may typically be inverted and reused.

The invention also encompasses an economical method of manufacturing cutter disks of the above-described type. Initially, this method entails the machining of a blank of tool steel to provide a plurality of flat annular disks of desired thickness. These disks are stacked in a series of arbors, for inner diameter and outer diameter shaping and grinding operations, and are heat treated using an "under hardening" technique. This process may involve successive blanking, roughing, and grinding stages, or may be modified to combine stages. Optionally, this process may include the final step of coating the cutter disk with a hard, wear resistant material such as titanium nitride. Alternatively, the process may entail the rough machining and finish grinding of tubular or bar stock, followed by the severing of the finished stock into annular disks.

A variety of cutter geometries are disclosed, including externally and internally toothed cutters, and spur gear and helical cutters. All cutting tools according to the present invention are characterized by the incorporation of an annular cutter disk having an invariant cross-section throughout its width (including identical upper and lower faces), and by the mounting of the disk at a negative face angle or rake angle.

BRIEF DESCRIPTION OF THE DRAWINGS

The above and additional aspects of the invention are illustrated in the detailed description of the preferred embodiments which follows, together with the drawings in which.

DETAILED DESCRIPTION

Reference should now be had to FIGS. 1–4 for a detailed description of a disposable disk cutter tool according to a first preferred embodiment of the invention. With reference to the axial sectional illustration of FIG. 1, the cutter assembly 10 is mounted to a spindle 13 of a conventional gear shaper/cutter machine, which rotates the spindle 13 and shaper/cutter 10 around its central axis A—A while reciprocating these with respect to the workpiece (i.e. gear being formed). During this longitudinal reciprocation the cutter assembly 10 is brought into cutting engagement with the workpiece, and toothed cutter disk 20 cuts teeth in the workpiece. Further details of the cutting operation are discussed below.

Figure 1:
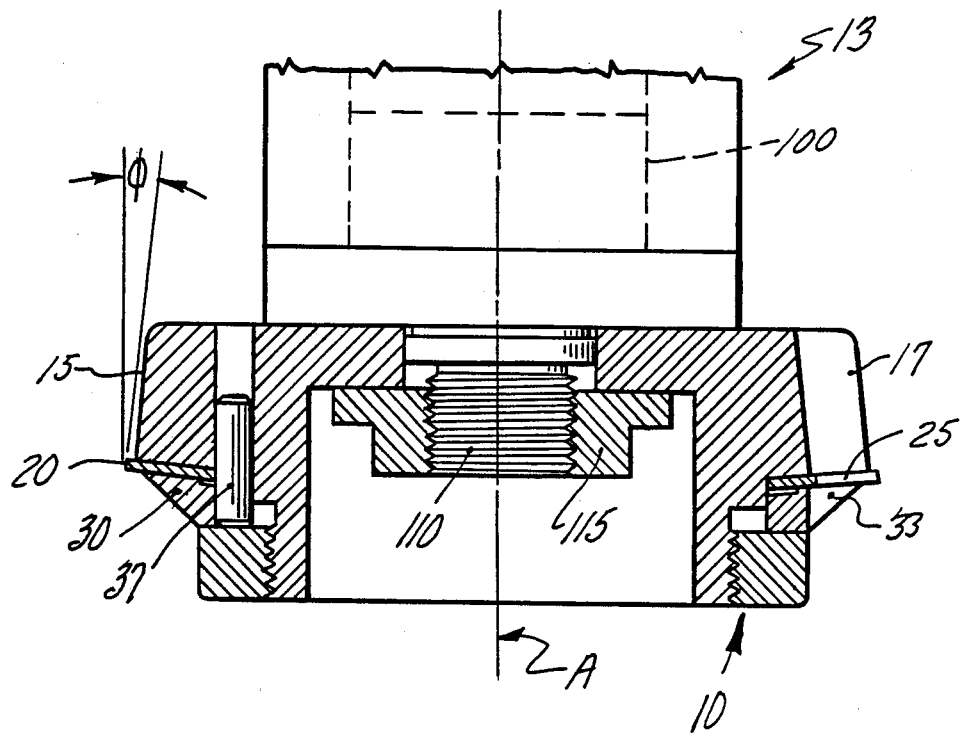
FIG. 1 is an axial sectional view of a cutter tool mounted on a shaper spindle, in a first embodiment of the invention.
Figure 3:
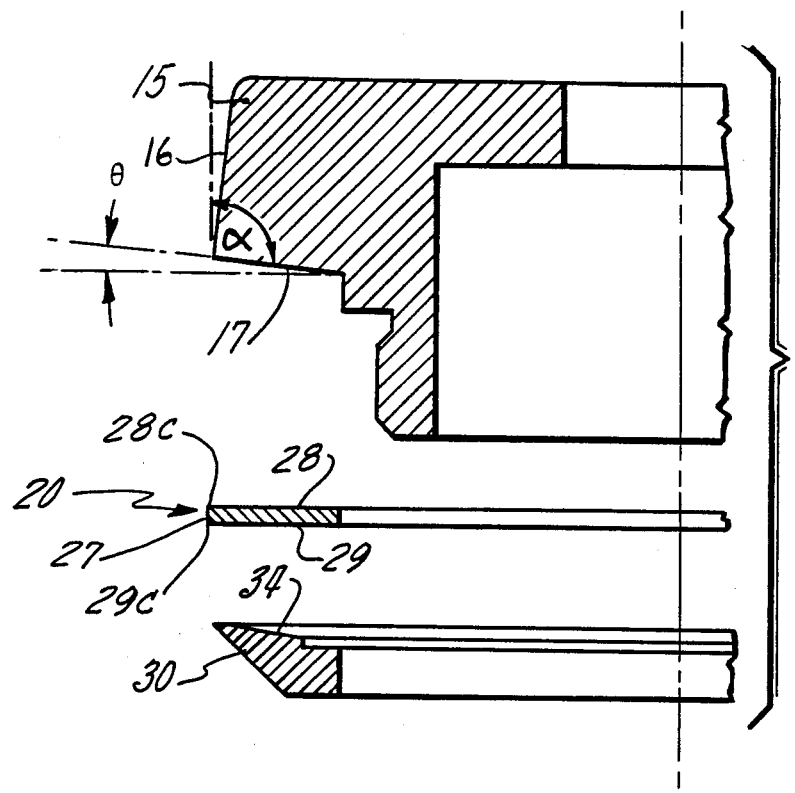
FIG. 3 is a partial exploded view of the cutter back, cutter disk, and retainer, as seen in section, from the cutter tool of FIG. 1.

The principal elements of cutter/shaper assembly 10, as best seen in FIG. 3, are flexible cutter disk 20, cutter back 15, and retainer 30. Referring to FIG. 1, cutter back is fitted to spindle adapter 100, which is mounted to spindle 13 (an inserted portion of the spindle adapter 100 being shown in phantom). The cutter back is secured to the shaft 110 of spindle adapter 100 by lock nut 115. In its undeflected state (FIG. 3), the cutter disk 20 takes the form of a flat annular disk; in use it is clamped between complementary mounting faces 17, 34 of cutter back 15 and retainer 30, respectively. Faces 17 and 34 are each annular sections of a shallow cone having its vertex at the central axis A, and both have negative face angles $\theta$ illustratively on the order of 5°–10°. Thus, upon clamping the flexible cutter disk 20 between faces 17 and 34 it conforms to this negative face angle, in a similar profile.

Figure 2:
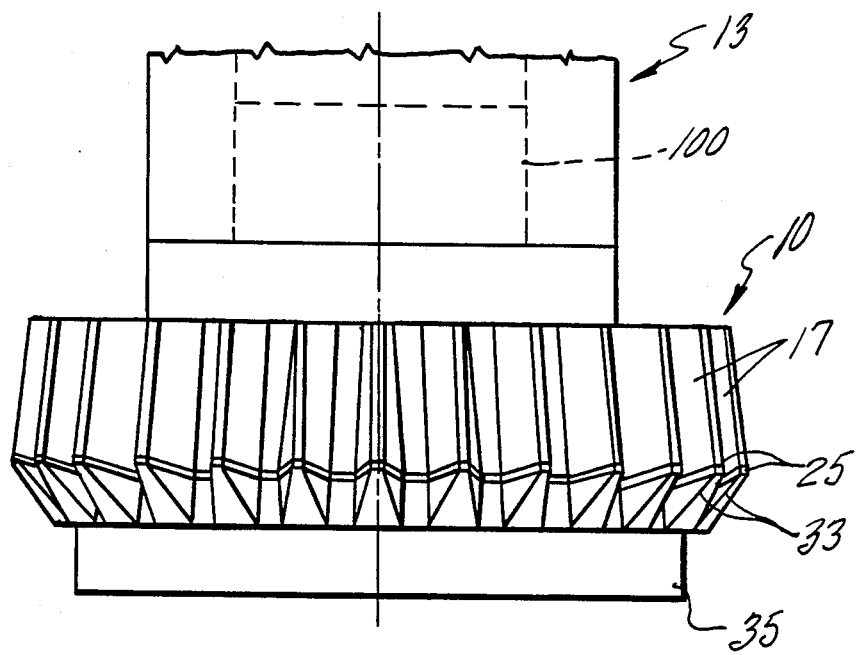
FIG. 2 is a side view of the cutter tool of FIG. 1.

As seen in FIG. 2 the cutter teeth 25 at the periphery of disk 20 are supported between corresponding tooth-like ridges 17 and 33 respectively on cutter back 15 and retainer 30 (compare the left and right-hand sections of FIG. 1, respectively taken through a tooth 25 and through a space between two teeth). Although in the embodiment of FIGS. 1–4 the cutter back 15 takes a form similar to a conventional shaper-cutter, by virtue of teeth-like ridges 17 and the conical profile of the cutter back, neither of these features is essential to the present invention. Compare the embodiments of FIGS. 5–7 (untapered cutter back profile); 8–10 (no supporting ridges on the cutter back). Similarly, the retainer may or may not include supporting ridges.

The clamping of disk 20 between cutter back 15 and retainer 30 is secured by clamping ring 25, and the former structures (all being of essentially circular cross-section) are angularly aligned by a locating pin 37 inserted through a hole in cutter back 15 and semicircular notches in disk 20 and retainer 30.

Figure 4:
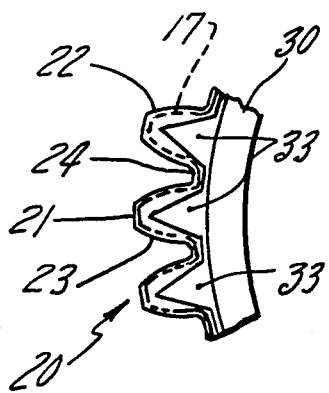
FIG. 4 is a partial plan view of the cutter disk of FIG. 1, showing several teeth in their relationship to mounting portions of the cutter back and retainer.

As seen from below in the plan view of FIG. 4, the teeth 25 of cutter disk 20 project beyond the support ridges 33, 17 (the latter being shown in phantom), thereby presenting reasonably unencumbered cutting edges for the cutting/shaping operation. The tooth flanks 22 and 23, together with top lands 21 and bottom lands 24, are conventional involute tooth profiles designed as conjugate forms to the teeth to be generated in the workpiece, for production of spur gears. In the flat, undeformed state of disk 20 the outer surfaces of teeth 25 (whether measured along the tooth flanks 22, 23 or at either of lands 21, 24) are untapered and normal to the upper and lower faces 28, 29 of disk 20. Accordingly, disk 20 has a constant profile and dimensions throughout its width, a feature which provides significant advantages in fabrication and use, as discussed below.

When disk 20 is clamped between back 15 and retainer 30, the projecting teeth 25 are held at a negative rake angle $\theta$ during the cutting operation, and the peripheral surfaces of the cutter teeth 25 become inwardly inclined toward the cutter back, to form tip clearance angles $\theta$ (cf. FIG. 1). For values of $\theta$ in the range of 5°–10°, side clearance angles on the order of 2° are formed. The shaper-cutter design of the present invention (as exemplified by the embodiment of FIGS. 1–4 as well as the further embodiments discussed below) departs from conventional design principles in disposing cutter disk 20 at a negative rake angle. Positive rake angles have been preferred in prior art shaper cutters as this is thought to reduce loading on the shaper-cutter assembly, and to facilitate removal of metal shaving residue from the cutting/shaping process. Applicants have observed, however, that the present tool configuration achieves comparable performance at high cutting speeds, when employing a suitable high speed tool steel for cutter disk 20, and fabricating this as described below, advantageously including providing a titanium nitride or other wear resistant coating. In operation the coating reduces friction at the cutting edges and improves the rate of metal chip removal at lower cutting forces.

The parameters for generating the profile of cutter disk teeth 25 are the inverse of those required to fabricate a conventional, undeflected cutter with an equivalent positive rake angle machined into the cutter. For example, if the negative face angle to which cutter disk 20 is deformed is 5°, its involute tooth forms should be analogous to those for a conventional cutter with a negative top rake angle of 5°. Thus, the cutter disk 20 is manufactured with a corrected profile in its undeformed state in order to produce the desired cutting profile after deflection.

The cutting edges of conventional shaper-cutter tools become dull after a period, and require resharpening by grinding the forward face of the tool (corresponding to face 17 of cutter back 15). Such grinding impairs the precision of the cutting edges, and removes any wear resistant surface coating. Various alternative designs have incorporated one or more insertable cutting members which are discarded when they become dull, but such insertable-cutter tools require replacement of the cutter after a single period of use. A principal advantage of the present cutter design is that after the cutting edges 29e of the cutter disk 20 become dull, the cutter disk may be inverted and reused with opposite edges 28e used for cutting (this assumes that the individual teeth of the cutter disk are bilaterally symmetric measured at either of the disk faces—almost always true in commercial applications). The disk inversion is made possible by the constant cross section of the cutter disk 20 throughout its width—a general characteristic of the present invention, whereby the disk has upper and lower faces of identical profile and dimensions. During reuse edges 28e provide sharp, coated cutting edges; the tool is discarded only after repeated use. Although in a conservative design the thickness of disks 20 is at least twice the maximum permitted wear of the cutting edges of teeth 25, we have observed that in typical operation the wear on the tooth trailing edges is two to three times the wear on the leading edges. After inversion of the tool for reuse, the trailing and leading edges are reversed (e.g. the trailing tooth flank during initial use becomes the leading tooth flank during reuse). Therefore in gear cutting applications it is possible for the cutter disk to be as thin as 1.33–1.5 times the permissible trailing edge wear.

Figure 6:
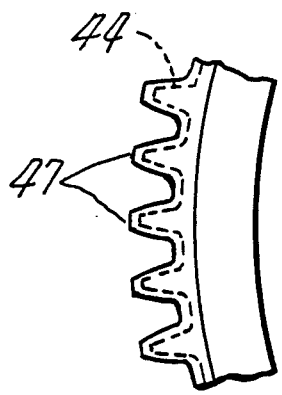
FIG. 6 is a partial plan view of the cutter disk of FIG. 5.
Figure 7:
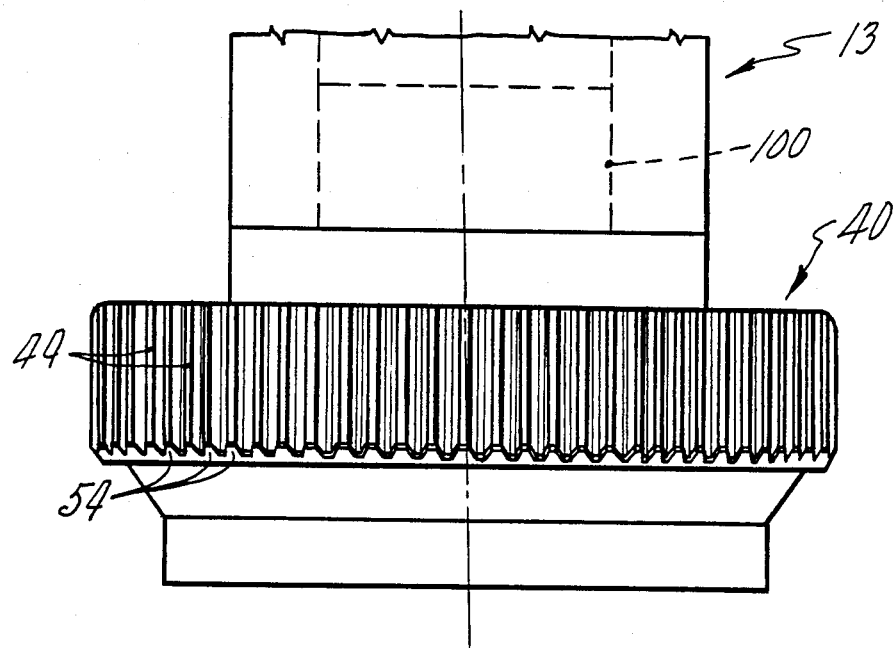
FIG. 7 is a side view of the shaper/cutter tool of FIG. 5.
Figure 5:
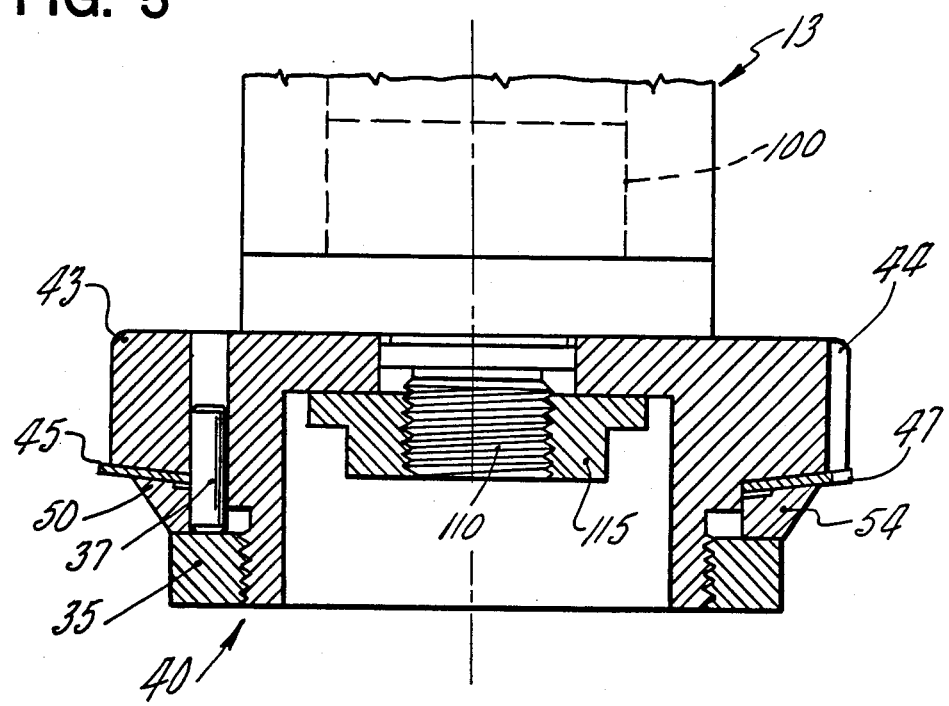
FIG. 5 is an axial sectional view of a cutter tool mounted in a shaper spindle, in a second embodiment of the invention.

FIGS. 5–7 illustrate a second disposable disk cutter according to the present invention. Shaper/cutter 40, comprised of cutter disk 45 clamped between cutter back 43 and retainer 50, is of a similar design to that of the tool 10 of FIGS. 1–4 (both being external tooth cutters for generation of tooth forms in spur gears), but the tool FIGS. 5–7 is designed to produce a fine pitch gear whereas that of FIGS. 1–4 has a coarse pitch. The most obvious difference is the greater number and finer arrangement of cutter back ridges 44 and cutter teeth 47 (FIGS. 6, 7) as compared with ridges 17 and cutter teeth 25 (FIGS. 2, 4). Cutter back 43 has an untapered outer circumference, in contrast to the conical outer circumference of cutter back 15 (FIG. 2).

Due to the negative face angles of these tools, the retainers 30, 50 must firmly clamp the teeth of cutter disk 20, 45 against cutter backs 15, 43 at a point distal the central axis A—A. Inasmuch as more substantial support is required for larger, coarse pitched teeth 25 than for the smaller teeth 47, retainer 30 includes ridges 33 clamping the underside of cutter disk teeth 25, whereas retainer 50 includes no supporting ridges. The retainer should provide sufficient clearance for removal of residual metal chips. Therefore, for cutter designs in which the retainer extends beyond the pitch line of the cutter teeth, the cutting process may be modified to employ multiple passes to achieve the diesired cutting rate, thereby producing finer chips. The surface coating on the cutter disk teeth reduces residue build-up and galling at the cutting edges.

Figure 8:
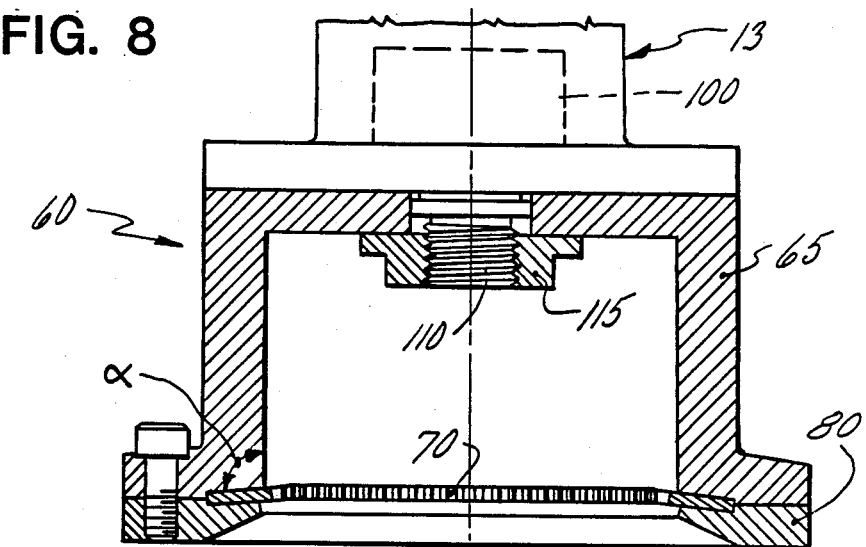
FIG. 8 is an axial sectional view of a third type of cutter/shaper tool.
Figure 9:
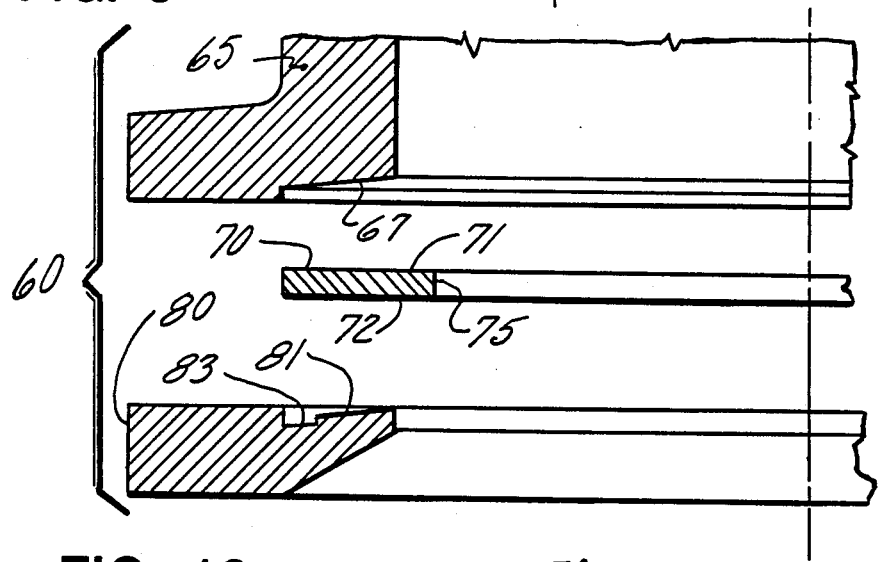
FIG. 9 is a partial exploded view of the cutter back, disk, and retainer, seen in section, from the tool of FIG. 8.
Figure 10:
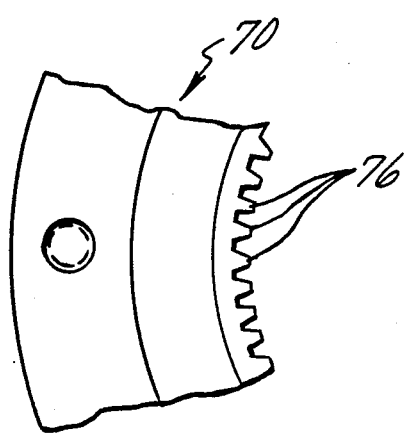
FIG. 10 is a partial plan view of the cutter disk of FIG. 8.
Figure 11:
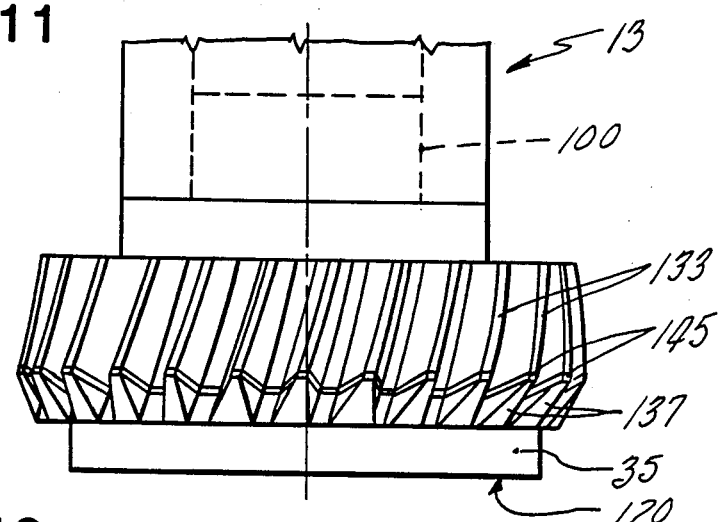
FIG. 11 is an axial sectional view of a fourth type of shaper/cutter tool.

FIGS. 8–10 illustrate a further, internal cutter, embodiment. Cutter back 65, which is mounted to spindle adaptor 100 as in the embodiments of FIGS. 1–7, comprises a hat-shaped member with an internal, convex mounting surface 67. Note that as used herein in describing the cutter back mounting face, the term "convex" denotes a greater than 90° angle α of said mounting face relative to the cutter axis A—A, measured at the contiguous wall of the cutter back (e.g. surfaces 67, 66 respectively in FIG. 9, or surfaces 17, 16 respectively in FIG. 3). Flexible cutter disk 75 is clamped between mounting surface 67 and a complementary surface 81 of retainer 80, the latter being undercut at 83. Mounting surface 67, 81 again are annular sections of shallow circular cones, which clamp cutter disk 70 and deform this member to form a conical profile of negative face angle. Analogously to the above-described embodiments, cutter disk 70 is fabricated with untapered side surfaces of its teeth 76 (including tooth flanks and lands). Thus, after the cutting edges of teeth 76 (FIG. 10) become dull, the disk 70 may be inverted and reused.

Figure 12:
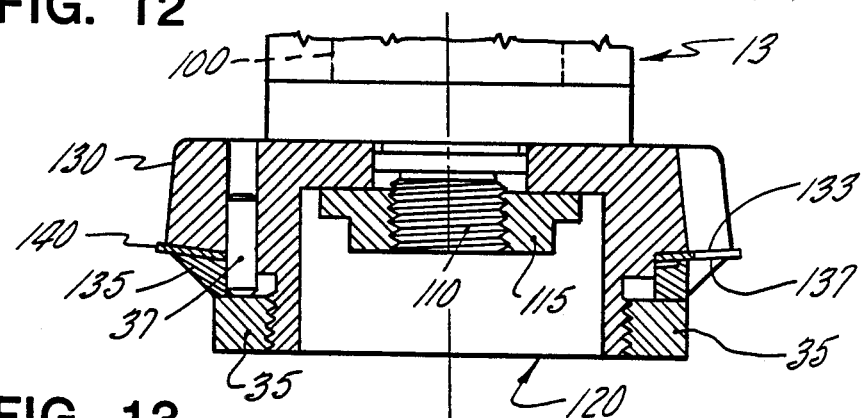
FIG. 12 is a side view of the tool of FIG. 11.

FIGS. 11–14 illustrate yet another type of cutter tool 120 incorporating a disposable cutter disk, for generating helical profiles. As shown in the transverse sectional view of FIG. 11, cutter assembly 120 contains components which are identical or analogous to those of the spur gearing cutters of FIGS. 1–7. The distinguishing features are best seen in FIG. 12—i.e. helical profiles of the cutter back ridges 133 and retainer ridges 137, these structures cooperating to clamp the teeth 145 of helical cutter disk 140. As in the embodiments discussed above, cutter disk 140 is manufactured as a flat annular structure (cf. FIG. 14), but is flexed to a shallow conical configuration with a negative face angle (and negative rake angle of the cutter teeth 145). Whereas prior art helical shaper-cutters typically have a stepped profile for the cutting face, cutter disk 140 is ground flat—an arrangement which simplifies the design and fabrication of such tools (note that this cutter disk design is amenable to the novel disk fabrication process of the invention, discussed below). Accordingly, the clamping faces 133 and 137 of cutter back 130 and retainer 137 are also flat annular sections of a shallow cone.

Figure 13:
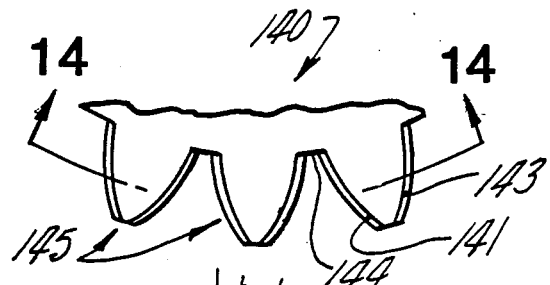
FIG. 13 is a partial plan view of the cutter disk from the tool of FIG. 11.
Figure 14:
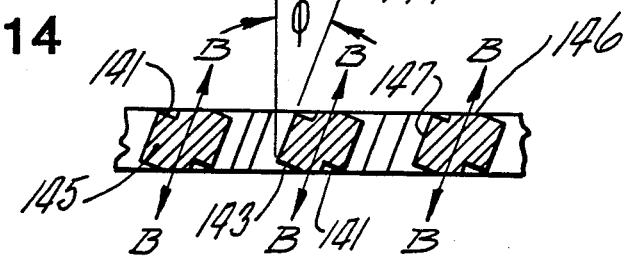
FIG. 14 is a fragmentary sectional view of the cutter disk, in a section taken along the line 14–14 in FIG. 13.

With reference to FIG. 13, showing a portion of the lower cutting face of disk cutter 140, the disk teeth 145 include grooves 141 along one edge, and are chamferred at the opposite edges 143. As seen in the sectional view of FIG. 14, taken along a circular section intermediate the bases and tips of teeth 145, the chamferred edges 143 provide cutting surfaces which are normal to the helix axis B—B. This arrangement provides comparable cutting performance to that achieved by stepped helix cutters, using a simpler and more economical design. Although the helical cutter disk 140 does not share the characteristic of the spur gear cutter embodiments that the teeth flank are normal to the disk faces (in fact they are inclined at helix angle θ), disk 140 does share the general feature of the invention that the cutter disk has a cross section of constant dimensions throughout its width.

Reference should now be had to FIGS. 15A–18, which illustrate an advantageous method for fabricating the disposable cutter disks of the invention, and tooling used in this method. Initially, a cylindrical tube 200 of high alloy, high speed tool steel is cut off from bar stock. This blank 200 is secured by chuck 201 and turned to reduce its outer diameter 203 to a desired value; a central bore 205 is drilled therethrough; and the tube is then sliced into multiple pieces 210 somewhat thicker than the desired final disk thickness (FIG. 15B). The pieces 210, now in the form of annular disks (FIG. 15c), are ground to a desired thickness and finish. This initial machining stage may start with a hollow tubular stock, and omit the step of drilling central bore 205.

Alternatively, this process may start with sheet stock of tool steel, and cut out the annular pieces 210 from the sheet stock using any of a variety of well known precision cutting or stamping processes (e.g. laser cutting). Advantageously, in this embodiment the initial disk cutting step may generate rough tooth forms, thereby eliminating the rough cutting step discussed below.

Figure 15A:
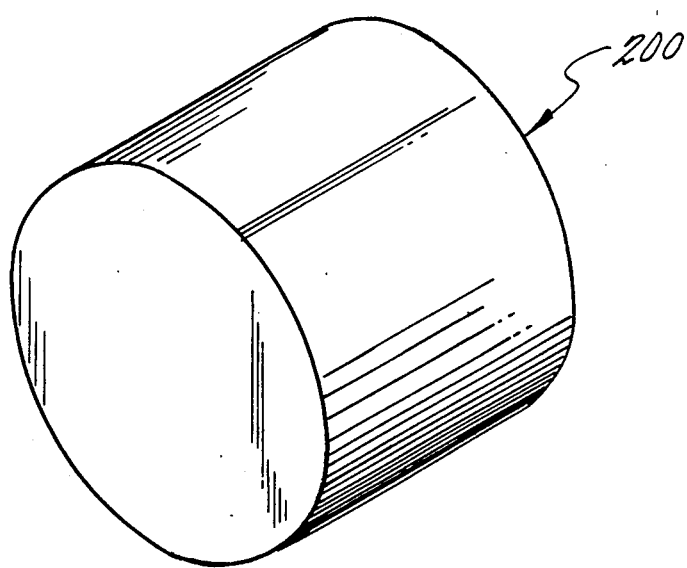
FIG. 15A is a perspective view of a cylindrical blank of tool steel.
Figure 15B:
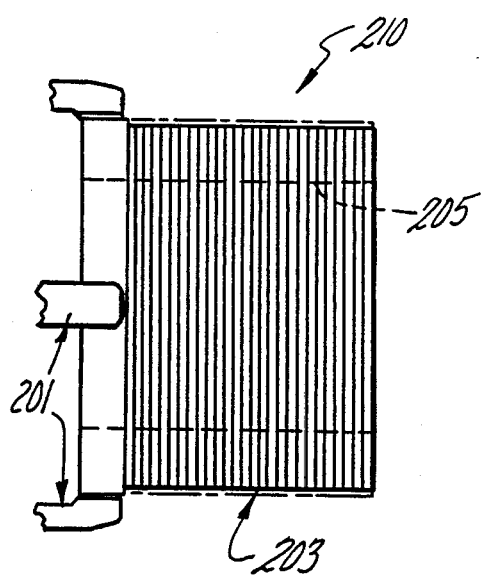
FIG. 15B is a side view of the blank of 15A, parted and drilled to form the pieces of 15C.
Figure 15C:
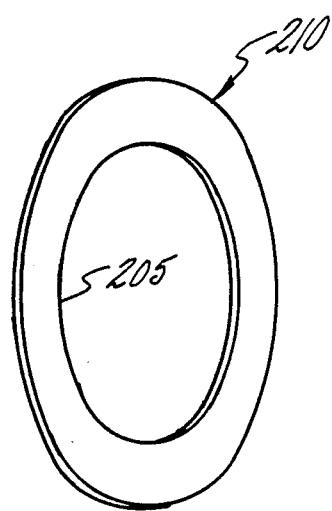
FIG. 15C is a perspective view of an annular disk, an intermediate stage in the production of a cutter disk.
Figure 16:
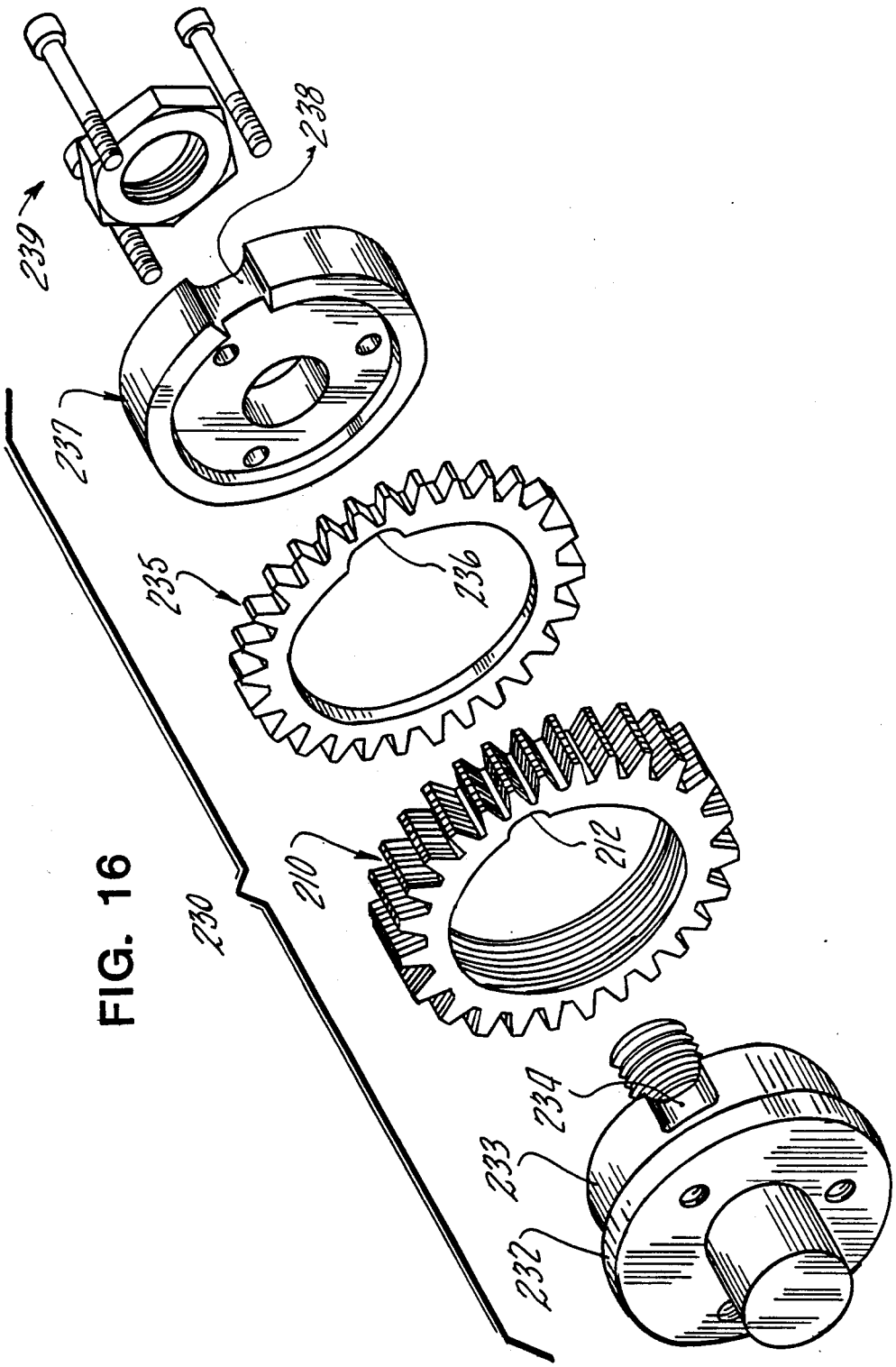
FIG. 16 is an exploded perspective view of a fixture for rough cutting the outer diameter of a set of the disks of FIG. 16.
Figure 17:
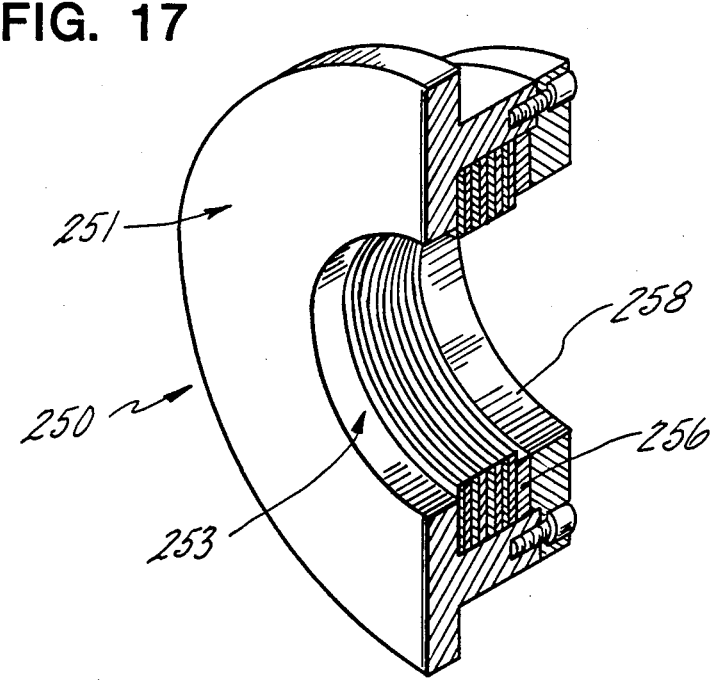
FIG. 17 is a sectional perspective view of an inner-diameter grinding fixture.
Figure 18:
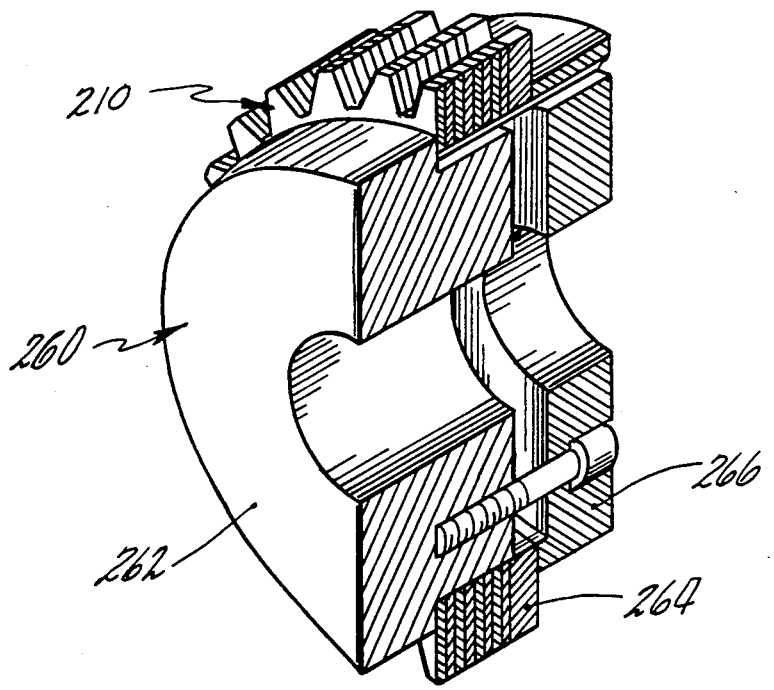
FIG. 18 is a sectional perspective view of an outer diameter finishing fixture.

The annular disk pieces 210 of FIG. 15c are loaded into a fixture 230, consisting of base 232 with arbor 233; spacer 235; cup washer 237; and fasteners 239. The pieces 210 are stacked on arbor 233 and secured using the components 235, 236, and 237. Base 232 includes a hollow 234, and spaceer 235 and washer 237 include corresponding notches 236, 238, all of these apertures being aligned. This fixture provides a clearance region at the outer diameter of disks 210 for cutting of teeth therein using a roughing shaper/cutter or hob; the cutting of teeth in disks 210 also cuts teeth in the outer diameter of spacer 235, which may be reused. Apertures 234, 236, and 238 permit access to disks 210 for drilling an alignment notch 212, illustratively along the center line of a tooth.

The pieces 210 are removed from fixture 230 for heat treatment. In the preferred fabrication process, this step utilizes the "under hardening" process which provides a desirable balance between hardness and toughness.

The heat treated pieces 210 are then loaded into hole grinding fixture 250 (seen in a cut-away view in FIG. 17), in which the internal hole 205 is ground to a desired inner diameter. Hole grinding fixture 250 includes base 251 with chamber 252 and access hole 253; apertured spacer 256; and clamping washer 258. Disks 210 are retained within chamber 252 by members 256 and 258 to permit internal diameter grinding via access hole 253. Disks 210 are then transferred to finishing/grinding fixture 260 (FIG. 18), in which the disk teeth 215 are ground to provide the desired tooth forms (e.g. involute profiles). Fixture 260 includes base 262, spacer 264, and cap 266. Inasmuch as these tooth forms provide outer surfaces normal to the faces of disk 210, this tooth finishing step may be applied at one time to a stack of disks 210.

The clamping together of multiple annular blanks on appropriate fixtures at various stages of the fabrication process provides marked advantages, including economy of manufacture, and reduced distortion during machining and heat treatment operations.

Finally, disks 210 may be coated with a thin, wear resistant surface film, such as titanium nitride applied by high vacuum vapor deposition. Other suitable surface coatings include titanium carbide, titanium carbonitride, boron nitride, or oxide coatings. Alternatively, suitable ion implantation surface treatments may be employed.

Figure 19:
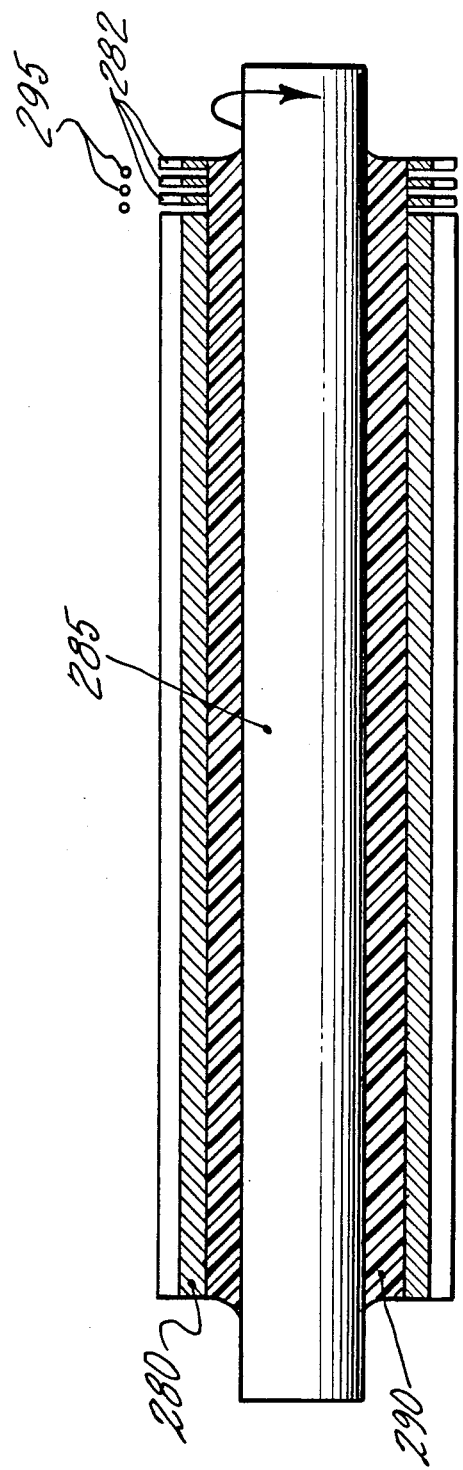
FIG. 19 is a sectional view of finish-ground toothed cylinder mounted to a cylindrical arbor for a disk severing operation, in accordance with an alternative fabrication process.

A further alternative manufacturing process, partially illustrated in FIG. 19, involves the following sequence of steps:
(1) Cutting bar or tubular stock to maximum feasible length for manufacture;
(2) Rough machining of external and internal dimensions and profile;
(3) Hardening and tempering;
(4) Finishing to desired profile; and
(5) Cutting off disks of desired thickness.

In an operative embodiment of step 5 of this manufacturing technique, a cylindrical arbor 285 was concentrically inserted within the bore of the finished disk cutter stock 280 obtained from step 4, and the gap between these was filled with an epoxy 290, which was then cured at room temperature (FIG. 19). This structure was rotated slowly in a lathe (not shown) while passing an array of EDM wires 295 (shown in part) through the wall of stock 280; the severed pieces 282 remained on the epoxy 290. The arbor 285 (coated with a release agent) and the pieces 282 were then removed from epoxy 290.

Although the disk fabrication processes illustrated in FIGS. 15A-19 are directed to the production of an externally toothed disk for generating spur gear tooth profiles, these processes may be suitably modified to produce internally toothed disks, or disks having helical profiles. Appropriate modifications in the tooling required, and in the roughing and grinding steps, etc. will be apparent to those of ordinary skill in the art.

While reference has been made above to specific embodiments, it will be apparent to those skilled in the art that various modifications and alterations may be made thereto without departing from the spirit of the present invention. The invention may be applied to a variety of applications involving tools for cutting metal and like tool materials for profiling of gears and gear-like objects. Such tools may provide involute or non-involute profiles; the term "teeth" should be understood to encompass profiles other than gear teeth and their conjugate forms.

Similarly, there are numerous variations of the fabrication process of the invention consistent with the requirement that the resulting cutter disk have upper and lower faces of idenical dimensions, with a constant cross-section throughout its width. Therefore, it is intended that the scope of this invention be ascertained by reference to the following claims.

We claim:

1. A cutter element for a cutter tool, said cutter tool forming gear teeth and like profiles in workpieces and comprising a cutter back having a contoured mounting surface for said cutter element and a series of circumferential ridges, a retainer having a mounting surface for said cutter element which mounting surface is complimentary to the mounting surface of said cutter back, and means for clamping said cutter element between the mounting surfaces of said cutter back and said retainer; said cutter element comprising:

a thin annular cutter disk including a series of circumferential teeth which teeth are flat in their unstressed condition and align with said ridges of said cutter back for support when clamped between said cutter back and said retainer, said teeth of said cutter disk protruding beyond said ridges and said retainer at an effective, negative rake angle when clamped, said cutter disk being flexible enough to assume the shape of the cutter back mounting surface without damage to itself when clamped between said cutter back and said retainer and said cutter disk teeth being invertibly symmetrical whereby said cutter disk is invertible in its orientation between said cutter back and said retainer after one side of said cutter disk becomes dull.

2. A cutter element as set forth in claim 1, wherein said cutter disk is flexible enough to withstand a negative rake angle of at least 5° without damage.

3. A cutter element as set forth in claim 2, wherein said cutter disk is flexible enough to withstand a negative rake angle of at least 5° without permanent deformation after removal from said cutter tool.

4. A cutter element as set forth in claim 1, wherein edges of the disk teeth which are outermost from the axis of the disk are perpendicular to the disk faces.

5. A cutter element as set forth in claim 4, wherein said cutter disk is shaped such that it has constant cross-sections throughout its thickness.

6. A cutter element as set forth in claim 1, wherein said cutter disk is symmetrical about a neutral plane located between the disk faces.

7. A cutter element as set forth in claim 1, wherein a primary cutting edge of said cutter disk adjoins a face of said cutter disk.

8. A cutter element as defined in claim 1, wherein the disk teeth have helical edge profiles.

9. A cutter element for a cutter tool, said cutter tool forming gear teeth and like profiles in workpieces and comprising a cutter back having a contoured mounting surface for said cutter element and a series of circumferential ridges, a retainer having a mounting surface for said cutter element which mounting surface is complimentary to the mounting surface of said cutter back, and means for clamping said cutter element between the mounting surfaces of said cutter back and said retainer; said cutter element comprising:

- a thin circular cutter disk including a series of circumferential teeth which teeth when clamped between said cutter back and said retainer align with said ridges of said cutter back for support, said teeth of said cutter disk protruding beyond said ridges and said retainer at an effective, negative rake angle when clamped, said cutter disk being formed of a tool steel which is hard enough and strong enough to cut gear teeth in a gear shaping process, said cutter disk being flexible enough to assume the shape of the cutter back mounting surface without damage to itself when clamped between said cutter back and said retainer, and said cutter disk teeth when flat being symmetrical about a neutral plane located between the disk faces so that said cutter disk is invertible in its orientation between said cutter back and said retainer after one side of said cutter disk becomes dull.

10. A cutter element as set forth in claim 9, wherein said cutter disk is flexible enough to withstand a negative rake angle of at least 5° without damage, edges of the disk teeth which are outermost from the axis of the disk are perpendicular to the disk faces, said cutter disk in its unstressed condition is flat and shaped such that it has constant cross-sections throughout its thickness, and a primary cutting edge of said cutter disk adjoins a face of said cutter disk.

* * * * *